(12) United States Patent
Lindskog et al.

(10) Patent No.: US 6,865,377 B1
(45) Date of Patent: Mar. 8, 2005

(54) COMBINED OPEN AND CLOSED LOOP BEAM FORMING IN A MULTIPLE ARRAY RADIO COMMUNICATION SYSTEM

(75) Inventors: Erik D. Lindskog, Sunnyvale, CA (US); Adam B. Kerr, Menlo Park, CA (US); Christopher Brunner, Sunnyvale, CA (US); Mitchell D. Trott, Mountain View, CA (US)

(73) Assignee: ArrayComm, Inc., San Jose, CA (US)

( * ) Notice: Subject to any disclaimer, the term of this patent is extended or adjusted under 35 U.S.C. 154(b) by 433 days.

(21) Appl. No.: 10/187,036

(22) Filed: Jun. 28, 2002

(51) Int. Cl.[7] .............................. H04B 1/02; H04C 7/02
(52) U.S. Cl. ...................... 455/101; 455/522; 375/299
(58) Field of Search ............................... 455/67.11, 69, 455/73, 101, 103, 226.1, 226.2, 522, 561, 562.1; 375/295, 299; 370/318, 320, 335, 342

(56) References Cited

U.S. PATENT DOCUMENTS

| | | | | |
|---|---|---|---|---|
| 5,842,118 A | * | 11/1998 | Wood, Jr. | 455/101 |
| 6,188,678 B1 | * | 2/2001 | Prescott | 455/69 |
| 6,295,289 B1 | * | 9/2001 | Ionescu et al. | 370/342 |
| 6,320,853 B1 | | 11/2001 | Wong et al. | |
| 6,377,812 B1 | * | 4/2002 | Rashid-Farrokhi et al. | 455/522 |
| 6,785,520 B2 | * | 8/2004 | Sugar et al. | 455/101 |

FOREIGN PATENT DOCUMENTS

| | | |
|---|---|---|
| DE | 10026077 A1 | 12/2001 |
| WO | WO01/63776 A2 | 8/2001 |

OTHER PUBLICATIONS

Pedersen and Mogensen, "A Simple Downlink Antenna Array Algorithm Based on a Hybrid Scheme of Transmit Diversity and Conventional Beamforming", Nokia Networks, 2001 IEEE, pps 58–62.

Lindskog and Paulraj, "A Transmit Diversity Scheme for Channels with Intersymbol Interference", Jun. 18–22, 2001, vol. 1, pp. 307–311.

* cited by examiner

*Primary Examiner*—Quochien B. Vuong
(74) *Attorney, Agent, or Firm*—Blakely, Sokoloff, Taylor & Zafman LLP

(57) ABSTRACT

A method and apparatus are provided that can combine the benefits of beamforming with transmit diversity. In one embodiment, the invention includes sampling a signal received from a remote radio at elements of an antenna array, deriving spatial parameters for transmitting a signal to the remote radio from an antenna array, sampling the signal received from the remote radio at elements of at least one additional antenna array, and deriving spatial parameters for transmitting a signal to the remote radio from the at least one additional antenna array. The invention further includes generating diversity parameters for transmitting a signal to the remote radio using each antenna array as an element of a diversity array, and transmitting a signal to the remote radio using the spatial parameters and the diversity parameters.

18 Claims, 3 Drawing Sheets

COMBINED OPEN AND CLOSED LOOP BEAM FORMING IN A MULTIPLE ARRAY RADIO COMMUNICATION SYSTEM

BACKGROUND OF THE INVENTION

1. Field of the Invention

The invention relates generally to the field of digital radio signal communications. More particularly, the invention relates to transmitting multiple formed signal beams with diversity to another radio using multiple transmit antenna arrays.

2. Description of the Related Art

Radio communications are sensitive to the environment in which the radio signals are transmitted and received. Communications can be lost or degraded when the environment is not favorable to the type of signals being transmitted. One particular environmental problem is fading due to scattering. This problem can cause multipath interference or completely prevent reception of a transmitted signal. One known way to mitigate fading due to scattering is to transmit the signal with diversity.

Spatial transmit diversity typically uses two antennas spaced apart some distance from each other. The same or different signals are sent from each antenna and the receiver will, in some way, use the signals from both antennas. Many different schemes can be used to transmit and receive the signals. Examples of transmit diversity schemes are transmit delay diversity, space time block coding, and closed loop transmit diversity.

Spatial division systems, such as SDMA (Spatial Division Multiple Access) systems, use beam forming to minimize interference by directing a signal at the particular radio intended for the signal. In some instances, it is also possible to direct nulls toward other users, further reducing interference for those other users. By directing the signal beam using arrayed antennas, the energy in the radio environment can be more precisely concentrated on a single radio receiver, reducing interference with and lowering the noise threshold for other user terminals.

BRIEF SUMMARY OF THE INVENTION

A method and apparatus are provided that can combine the benefits of beamforming with transmit diversity. In one embodiment, the invention includes sampling a signal received from a remote radio at elements of an antenna array, deriving spatial parameters for transmitting a signal to the remote radio from an antenna array, sampling the signal received from the remote radio at elements of at least one additional antenna array, and deriving spatial parameters for transmitting a signal to the remote radio from the at least one additional antenna array. The invention further includes generating diversity parameters for transmitting a signal to the remote radio using each antenna array as an element of a diversity array, and transmitting a signal to the remote radio using the spatial parameters and the diversity parameters.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

According to one embodiment of the invention, two or more antenna arrays each with multiple antenna elements are each used to form or direct a communications signal beam to a remote receiver. The beams can be formed using conventional adaptive antenna array techniques. The arrays are used as diversity transmitters in a closed loop coherent combining transmit diversity scheme such as the closed loop transmit diversity mode set forth in the standards for WCDMA.

Process Flow

Figure 1:
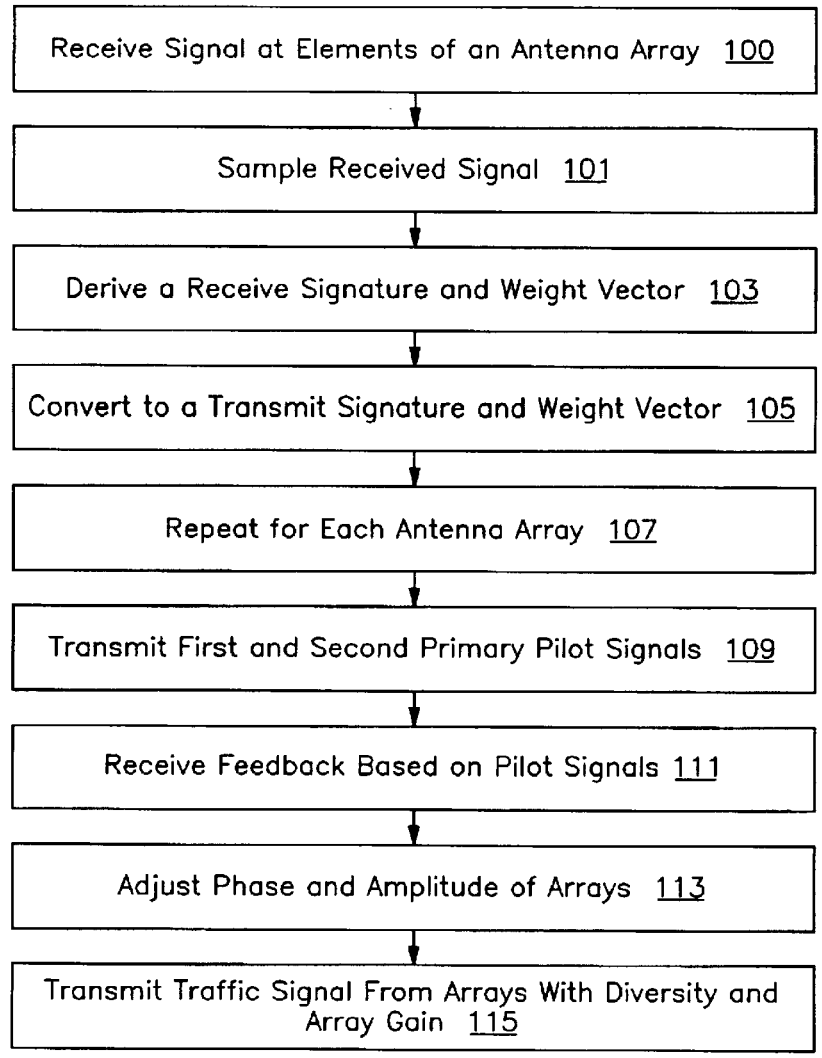
FIG. 1 is a flow chart showing one embodiment of the present invention.
Figure 2:
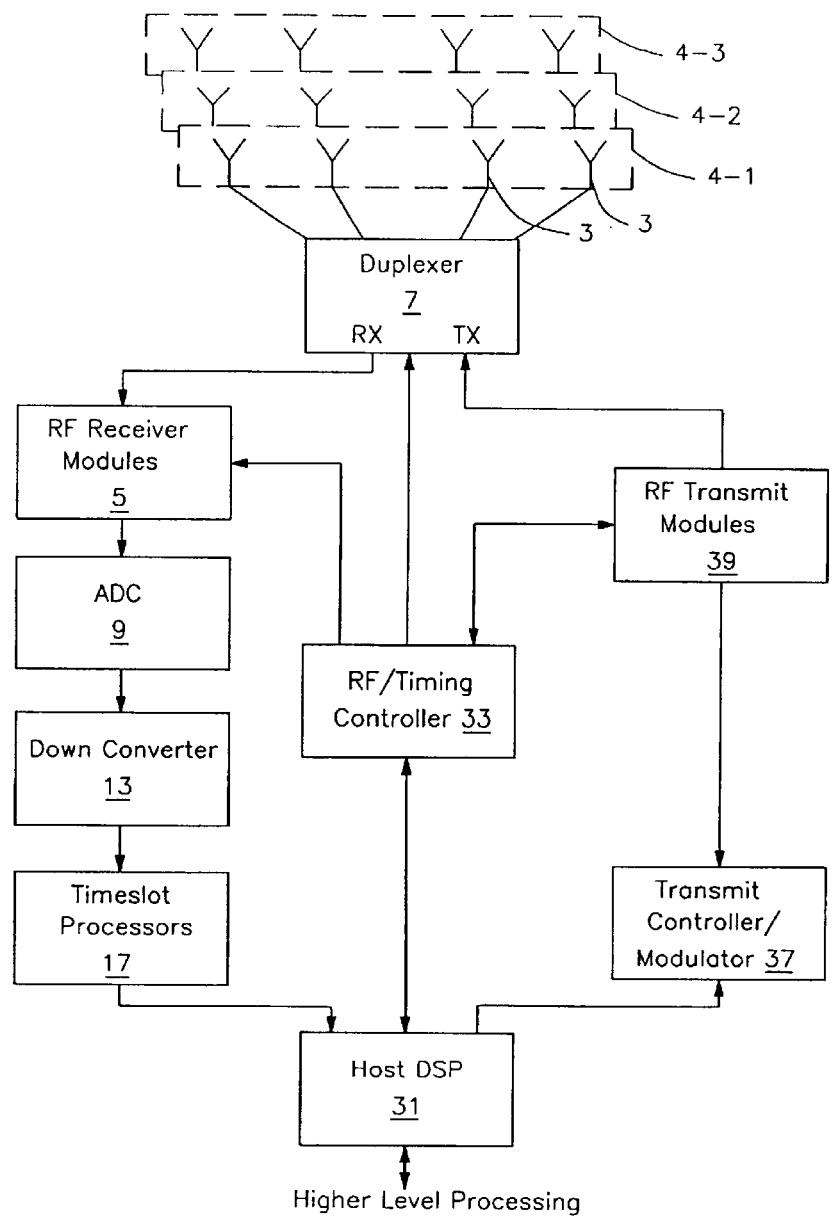
FIG. 2 is a simplified block diagram of a base station on which an embodiment of the invention can be implemented.
Figure 3:
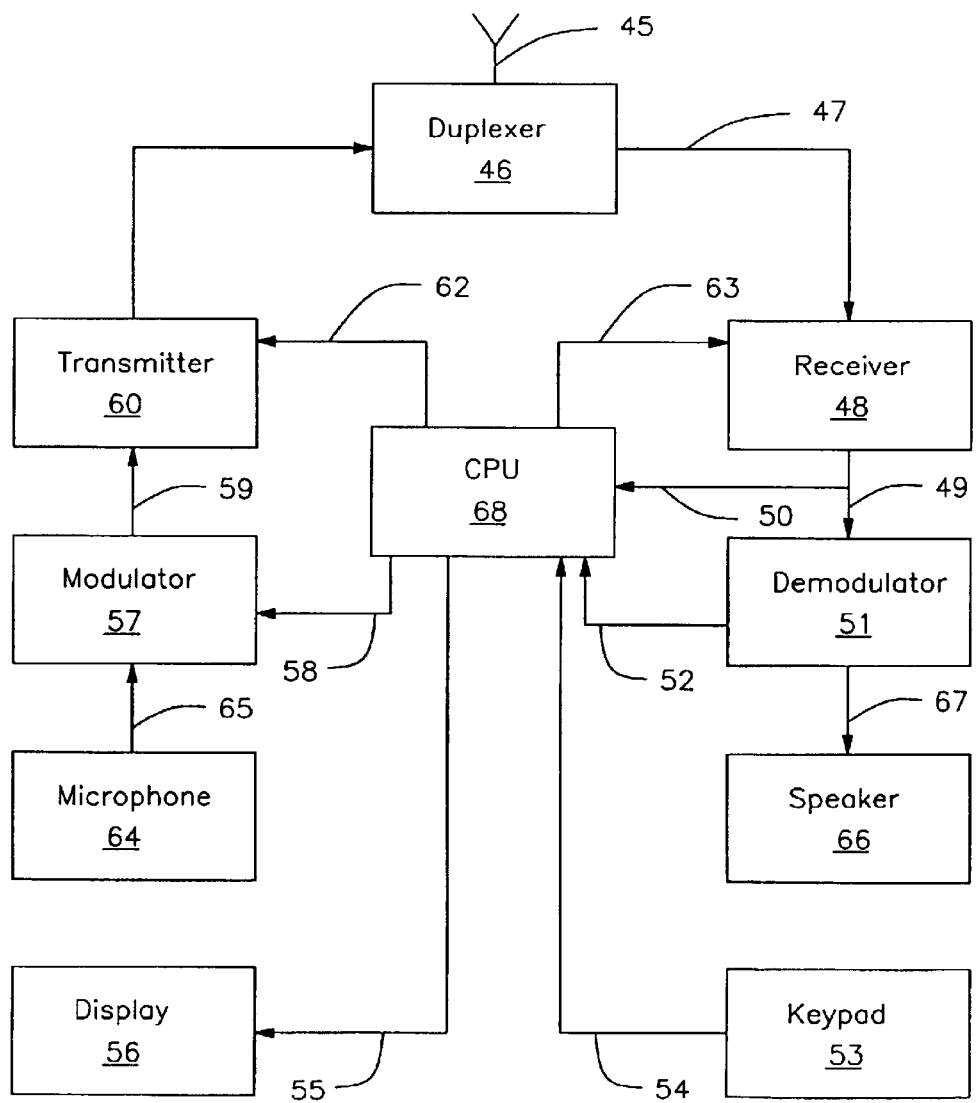
FIG. 3 is a block diagram of a remote terminal on which an embodiment of the invention can be implemented.

Referring to FIG. 1, a base station, such as the one shown in FIG. 2, receives uplink signals 100 at its antenna arrays, such as the arrays 4 of FIG. 2. In a simple embodiment as discussed herein, the base station will have two antenna arrays and each array will have several elements. Four elements are shown in FIGS. 2 and 3, however, there may be more or fewer elements in each array. Similarly there may be more than two or three arrays. The arrays can be set up to provide any type of diversity desired, e.g. polarization and spatial diversity or a combination of the two. In the described embodiment, the same antenna arrays are used for receiving and transmitting, however, different arrays can be provided for each.

In one embodiment, the arrays provide spatial diversity and so are spaced apart from each other. The arrays are spaced far enough apart from each other to achieve good diversity. When, as in the present embodiment, the same arrays are used for receiving and transmitting, the spacing will depend upon both uplink and downlink frequencies.

The received signal is sampled at elements of the antenna arrays 101. The received signal can be sampled at every element of each array. These arrays can be the same arrays as the transmit arrays, as shown in FIG. 3, or they can be separate receive arrays. It is convenient to use samples from each element of each array when the signal is already sampled in order to be demodulated. However, it is not necessary that samples from every single element be used. The samples can then be used to derive a receive signature and weight vector 103. This is converted to a transmit signature and weight vector 105 that can be used to transmit a directed beam to the remote radio. The process is repeated for each antenna array 107. As a result, a set of transmit spatial parameters are determined for each antenna array. The spatial parameters of each array can be determined independently of each other array or jointly or using data from both arrays.

The spatial parameters can be rendered in many different forms. In one embodiment, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters can comprise a receive spatial signature and weight vector for each remote terminal and a transmit spatial signature and weight vector for each terminal. Spatial receive and transmit parameters can also be shared for groups of terminals. In this case, there is a different set of spatial signatures and weight vectors for each antenna array.

Using the spatial signatures, weight vectors, and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. The benefits are even greater for subscribers that are spatially separated from one another. The spatial parameters can also include such things as the spatial location of the terminals, power levels, the directions-of-arrival (DOAs), times-of-arrival (TOAs) and the distance from the base station.

Estimates of parameters such as signal power levels, DOAs, and TOAs can be determined using known training sequences placed in digital data streams in conjunction with sensor (antenna) array information. This information is then used to calculate appropriate weights for spatial demultiplexers, multiplexers, and combiners. Techniques well known in the art can be used to exploit the properties of the pilot signal or training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

Having determined spatial parameters, such as spatial signatures and weight vectors for each array, a transmit diversity strategy can be established. In a spatial diversity embodiment, aimed toward coherent combining of the transmissions from the two arrays, the transmit diversity strategy can be based on a relative amplitude and phase to be applied between the formed beams of each array. In a system with two arrays, there is a single amplitude and phase relationship.

The relative phases and amplitudes between the arrays can be determined and adjusted using feedback from the remote terminal. Some radio communications standards provide for power level feedback in which the remote measures its received power and feeds back an indicator of the power level back to the base station. In other standards, the remote terminal is required to compare two different signals from the base station and feed back some indication of the relative phase or amplitude of the signals. By using this feedback, the transmit diversity parameters can be fine tuned for each remote terminal.

The specific nature of the feedback signals and how they can be used to generate spatial signatures or similar data sets depends on the type of system to which the present invention is applied. The WCDMA standard, for example, supports two closed loop transmit diversity modes in which the remote user terminal provides some feedback to the base station. The WCDMA closed loop transmit diversity schemes are provided in the standard as a way to decrease the effect of fading in downlink signals by placing two antennas widely apart (in order to decrease their spatial correlation). There are two variations on the closed loop transmit diversity scheme, mode 1 and mode 2, which differ primarily in the precision of the measurement that is performed and fed back by the remote user terminal. Feedback received from a remote terminal operating in either mode can be used. However, a higher precision in the feedback measurements can give a higher gain in the received power at the remote terminal.

In closed loop transmit diversity modes 1 and 2, the WCDMA base station sends the same dedicated signal out of two different antennas. It does this by sending the signal to the remote user terminal over two antennas with different complex scaling. These two signals are designed to add constructively at the remote user terminal. The base station also transmits one control signal (called the common pilot channel or CPICH) on each antenna with the same scrambling code but different symbols. In a mode 2 embodiment, accordingly, the base station will transmit first and second primary pilot signals (CPICH) 109.

The remote user terminal uses these two pilot signals to separately estimate the channel seen from each antenna. It then computes a set of weights for phase and amplitude which, if applied to one of the two dedicated signals relative to the other, would maximize the received quality of the two combined dedicated signals. These weights are quantized in different ways depending on the closed loop mode, and the quantized result is fed back to the base station. The feedback information is provided during a session while data traffic is being sent to and from the remote. For example, in closed loop transmit diversity mode 2, the phase feedback from the remote user terminal is quantized to an accuracy of $\pi/4$ and the amplitude feedback indicates one of two ratios between the two signals. It is also possible to use transmit diversity mode 1, the difference is that only the phase feedback is provided by the remote user terminal (with an accuracy of $\pi/2$).

The purpose of the transmit diversity feedback signal, according to standard documents, is to allow the base station to continually adjust the complex scaling of its two transmit signals so that they combine favorably, and with equal amplitude, at the user terminal. This process is then repeated every slot.

The standard recommends that the remote user terminal solve for the weight vector w by maximizing:

$$P = w^H H^H w$$

where $H=[h1, h2]$ and $w=[w1, w2]^T$ and where h1 and h2 are the estimated impulse response of the channel seen on each antenna and $^H$ indicates a Hermitian matrix. However, this method of solving for the weight vector w is only a recommendation. The standard allows for a remote user terminal to do any other kind of suboptimal solution.

In the WCDMA closed loop transmit diversity modes, two different pilot signals, each from a different antenna, are compared to each other. In an embodiment of the invention with only two arrays, each array can be used as one of the two antennas. It is also possible to have any other number of arrays. The base station receives the feedback signals 111 in whatever form the standard supports. The examples above, use pre-existing protocols of wireless communications standards, but new protocols can be established as well. This feedback is then used to adjust the relative phase and amplitude of the arrays 113.

The parameters for spatial division between elements of each array can then be combined with the parameters for transmit diversity between the arrays to transmit a signal 115 that will optimize reception by the remote terminal. Both types of parameters can be fine-tuned as communication continues between the two radios.

The multiple arrays allow a strategy to be selected that maximizes the average received power at a remote radio, such as the user terminal shown in FIG. 3. This can be done by finding downlink phase and amplitude differences that exploit the capabilities of the arrays to the greatest benefit. In one embodiment, the phase and amplitude differences of a received signal are used to determine a phase difference to apply between the transmit arrays that maximizes the power delivered to the remote radio. An amplitude difference can be applied between the transmit arrays instead of a phase difference or in addition to a phase difference. The received power as seen by the remote will include power received by the remote radio after any gain from combining the diversity signals. The antenna arrays can be designed to each transmit a different version of the communications signal. The versions can have different encoding, different amplitudes, different phases and different delays among other parameters.

In order to facilitate the demodulation of the signal in the remote's receiver, different forms of pilot information can be provided to the remote. Dedicated pilot symbols can be included in the user specific or beam-formed signal transmitted to the remote, enabling the remote to estimate the channel of the user specific signal it is receiving. Another alternative is to provide pilot signals transmitted on beams that are used to transmit to one or more than one user, also allowing the user terminal to estimate the channel of the signal it is receiving.

Base Station Structure

FIG. 2 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 3. The base station may be connected to a wide area network (WAN) through its host DSP 31 for providing any required data services and connections external to the immediate wireless system.

To support spatial diversity, a plurality of antennas 3 is used, for example four antennas, although other numbers of antennas may be selected. Each antenna is an element of a four-element array 4. And a plurality of arrays are provided 4–1, 4–2, 4–3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous an analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33.

The RF timing controller 33 interfaces with the RF system, shown as block 45 and also produces a number of timing signals that are used by both the RF system and the modem. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 35. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 35. The transmit modules 35 up-convert the signals to the transmission frequency and amplify the signals. The amplified transmission signal outputs are sent to antennas 3 via the duplexer/time switch 7. In a CDMA: system, the signals may also be spread and scrambled using appropriate codes.

User Terminal Structure

FIG. 3 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300. Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 land the demodulator 51 through lines 65 and 66, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 2 and 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base stations could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/ machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   sampling a signal received from a remote radio at elements of an antenna array;
   deriving spatial parameters for transmitting a signal to the remote radio from a first transmit antenna array using the samples;
   sampling the signal received from the remote radio at elements of at least one additional antenna array;
   deriving spatial parameters for transmitting a signal to the remote radio from a second transmit antenna array using the samples of the received signal at the additional antenna array;
   receiving feedback signals from the remote radio;
   generating diversity parameters for transmitting a signal to the remote radio using the first and second transmit antenna arrays as diversity antennas based on the received feedback; and
   transmitting a signal to the remote radio from the first and second transmit antenna arrays using the spatial parameters and the diversity parameters.

2. The method of claim 1, wherein sampling the signal comprises measuring phases and amplitudes of the received signal at each element of each antenna array.

3. The method of claim 1, wherein the spatial parameters comprise a transmit spatial signature and a transmit weight vector and wherein deriving spatial parameters comprises deriving a receive spatial signature and a receive weight vector and converting the receive spatial signature and the receive weight vector to a transmit spatial signature and a transmit weight vector.

4. The method of claim 1, wherein generating diversity parameters comprises selecting relative phases for the first and second transmit antenna arrays.

5. The method of claim 1, wherein generating diversity parameters comprises transmitting pilot signals from the antenna arrays, receiving feedback from the remote radio based on the pilot signals, and determining the diversity parameters based on the received feedback.

6. The method of claim 5, wherein transmitting pilot signals comprises transmitting a pilot signal from the first transmit antenna array and from the second transmit antenna array.

7. The method of claim 5, wherein determining the diversity parameters comprises adjusting the relative phase and amplitude of the transmit antenna arrays.

8. The method of claim 1, wherein receiving feedback comprises receiving feedback in accordance with a closed loop transmit diversity protocol.

9. The method of claim 1, wherein sampling a signal comprises sampling the signal as received at the first transmit antenna array and wherein sampling the signal at elements of at least one additional antenna array comprises sampling the signal at the second transmit antenna array.

10. A machine-readable medium having stored thereon data representing instructions which, when executed by a machine, cause the machine to perform operations comprising:
   sampling a signal received from a remote radio at elements of an antenna array;
   deriving spatial parameters for transmitting a signal to the remote radio from a first transmit antenna array using the samples; sampling the signal received from the remote radio at elements of at least one additional antenna array;
   deriving spatial parameters for transmitting a signal to the remote radio from a second transmit antenna array using the samples of the received signal at the additional antenna array;

receiving feedback signals from the remote radio;

generating diversity parameters for transmitting a signal to the remote radio using the first and second transmit antenna arrays as diversity antennas based on the received feedback; and transmitting a signal to the remote radio from the first and second transmit antenna arrays using the spatial parameters and the diversity parameters.

11. The medium of claim 10, wherein the instructions for sampling the signal comprise instructions which, when executed by the machine, cause the machine to perform further operations comprising measuring phases and amplitudes of the received signal at each element of each antenna array.

12. The medium of claim 10, wherein the instructions for generating diversity parameters comprise instructions which, when executed by the machine, cause the machine to perform further operations comprising selecting relative phases for the first and second transmit antenna arrays.

13. The medium of claim 10, wherein the instructions for generating diversity parameters comprise instructions which, when executed by the machine, cause the machine to perform further operations comprising transmitting pilot signals from the antenna arrays, receiving feedback from the remote radio based on the pilot signals, and determining the diversity parameters based on the received feedback.

14. An apparatus comprising:

a receiver to sample a signal received from a remote radio at elements of an antenna array and at elements of at least one additional antenna array;

a signal processor to derive spatial parameters for transmitting a signal to the remote radio from a first transmit antenna array and from a second transmit antenna array based on the samples and to generate diversity parameters for transmitting the signal to the remote radio using the first and second transmit antenna arrays as diversity antennas by receiving feedback signals from the remote radio and determining diversity parameters based on the received feedback; and a transmitter to transmit a signal to the remote radio from the first and second transmit antenna arrays using the spatial parameters and the diversity parameters.

15. The apparatus of claim 14, wherein the receiver samples the signal by measuring phases and amplitudes of the received signal at each element of each antenna array.

16. The apparatus of claim 14, wherein the spatial parameters comprise a transmit spatial signature and a transmit weight vector and wherein the receiver derives spatial parameters by deriving a receive spatial signature and a receive weight vector and converting the receive spatial signature and the receive weight vector to a transmit spatial signature and a transmit weight vector.

17. The apparatus of claim 14, wherein the transmitter further transmits pilot signals from the antenna arrays, wherein the receiver receives feedback from the remote radio based on the pilot signals, and wherein the signal processor determines the diversity parameters based on the received feedback.

18. The apparatus of claim 17, wherein the receiver receives feedback in accordance with a closed loop transmit diversity protocol.

* * * * *